US012592813B2

(12) United States Patent
Li et al.

(10) Patent No.: US 12,592,813 B2
(45) Date of Patent: Mar. 31, 2026

(54) TIME SYNCHRONIZATION SUBDEVICE, TIME SHARING SYSTEM, TIME SHARING METHOD, AND RECORDING MEDIUM

(71) Applicant: Mitsubishi Electric Corporation, Tokyo (JP)

(72) Inventors: Lei Li, Tokyo (JP); Hiroshi Komori, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 468 days.

(21) Appl. No.: 18/039,719

(22) PCT Filed: Jun. 10, 2021

(86) PCT No.: PCT/JP2021/022201
§ 371 (c)(1),
(2) Date: Jun. 1, 2023

(87) PCT Pub. No.: WO2022/259486
PCT Pub. Date: Dec. 15, 2022

(65) Prior Publication Data
US 2024/0039685 A1      Feb. 1, 2024

(51) Int. Cl.
*H04L 7/00*          (2006.01)
(52) U.S. Cl.
CPC ................................. *H04L 7/0008* (2013.01)
(58) Field of Classification Search
CPC ....... H04L 7/0008; H04L 12/42; H04L 41/00; H04J 3/0641

(Continued)

(56) References Cited

U.S. PATENT DOCUMENTS

2010/0098202 A1      4/2010  Lai et al.
2014/0369342 A1*   12/2014  Kondo ............. H04W 56/0035
                                                                      370/350

(Continued)

FOREIGN PATENT DOCUMENTS

JP          2010-103970 A      5/2010
JP          2013-085278 A      5/2013

(Continued)

OTHER PUBLICATIONS

International Search Report and Written Opinion mailed on Aug. 17, 2021, received for PCT Application PCT/JP2021/022201, filed on Jun. 10, 2021, 8 pages including English Translation.

*Primary Examiner* — Obaidul Huq
(74) *Attorney, Agent, or Firm* — XSENSUS LLP

(57)          ABSTRACT

A time synchronization subdevice includes a periodic data receiver that receives periodic data transmitted periodically from a time synchronization reference device, an acquirer that acquires first priority information indicating a first priority assigned to the time synchronization reference device, a first priority transmitter that transmits the first priority information to another time synchronization subdevice, a second priority information transmitter that transmits, when the periodic data is interrupted, transmission information indicating a second priority assigned to the time synchronization subdevice, a second priority information receiver that receives reception information indicating a second priority assigned to a device different from the time synchronization subdevice, and a distributor that distributes, when the periodic data is interrupted and the second priority indicated with the transmission information is higher than the second priority indicated with the reception information, time measured by a clocking unit as new shared time to the another time synchronization subdevice.

7 Claims, 11 Drawing Sheets

(58) Field of Classification Search
USPC ......................................... 370/464, 498, 503
See application file for complete search history.

(56)                    References Cited

U.S. PATENT DOCUMENTS

2017/0371041 A1* 12/2017 Oda ........................ G01S 19/37
2019/0069255 A1*  2/2019 Zhao .................... H04W 56/00
2021/0152266 A1    5/2021 Sakaue

FOREIGN PATENT DOCUMENTS

JP            6523589 B1     6/2019
WO        2013/121568 A1     8/2013

* cited by examiner

Figure 4:
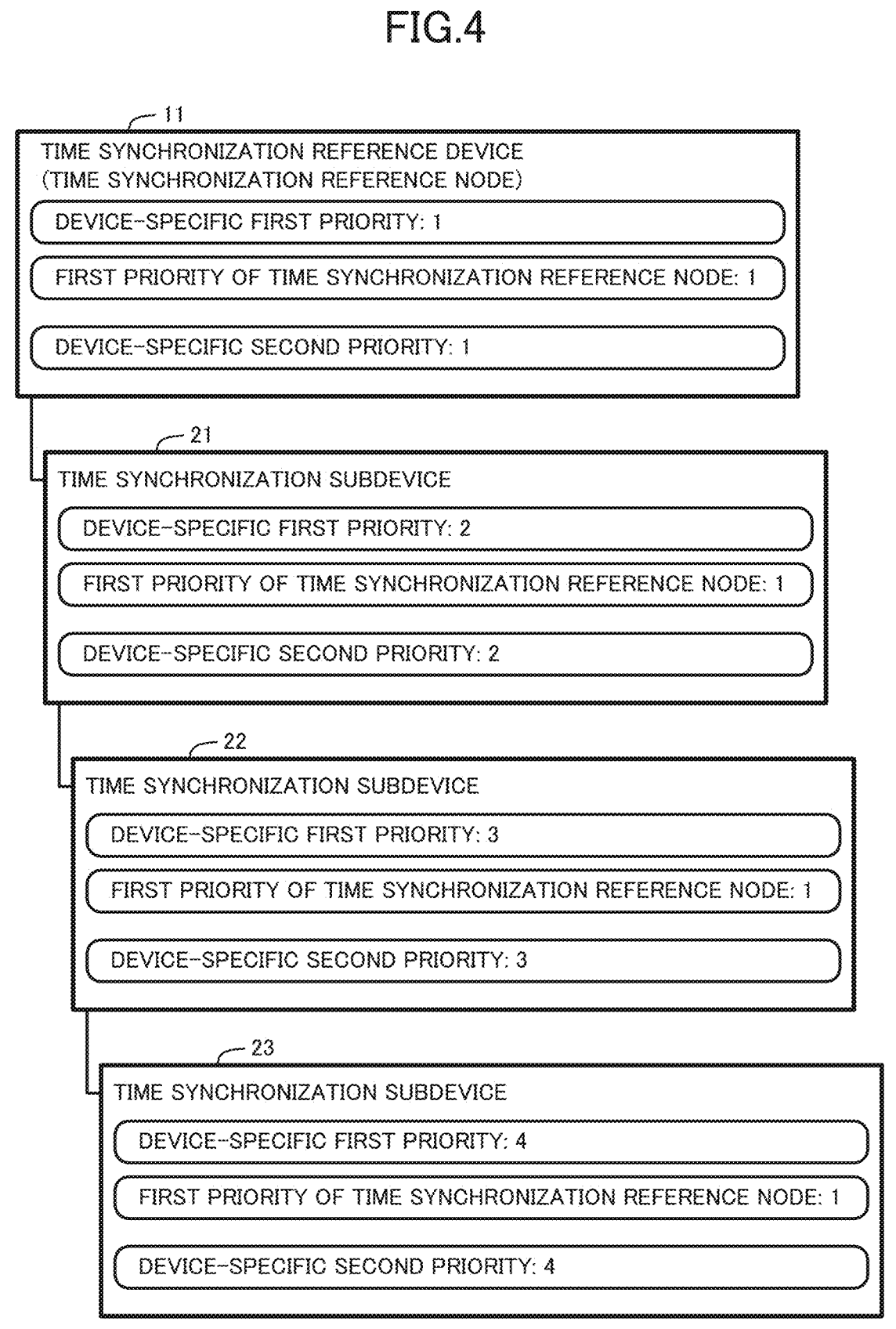

TIME SYNCHRONIZATION REFERENCE DEVICE
(TIME SYNCHRONIZATION REFERENCE NODE)

DEVICE-SPECIFIC FIRST PRIORITY: 1

FIRST PRIORITY OF TIME SYNCHRONIZATION REFERENCE NODE: 1

DEVICE-SPECIFIC SECOND PRIORITY: 1

21

TIME SYNCHRONIZATION SUBDEVICE

DEVICE-SPECIFIC FIRST PRIORITY: 2

FIRST PRIORITY OF TIME SYNCHRONIZATION REFERENCE NODE: 1

DEVICE-SPECIFIC SECOND PRIORITY: 2

22

TIME SYNCHRONIZATION SUBDEVICE

DEVICE-SPECIFIC FIRST PRIORITY: 3

FIRST PRIORITY OF TIME SYNCHRONIZATION REFERENCE NODE: 1

DEVICE-SPECIFIC SECOND PRIORITY: 3

23

TIME SYNCHRONIZATION SUBDEVICE

DEVICE-SPECIFIC FIRST PRIORITY: 4

FIRST PRIORITY OF TIME SYNCHRONIZATION REFERENCE NODE: 1

DEVICE-SPECIFIC SECOND PRIORITY: 4

FIG.11

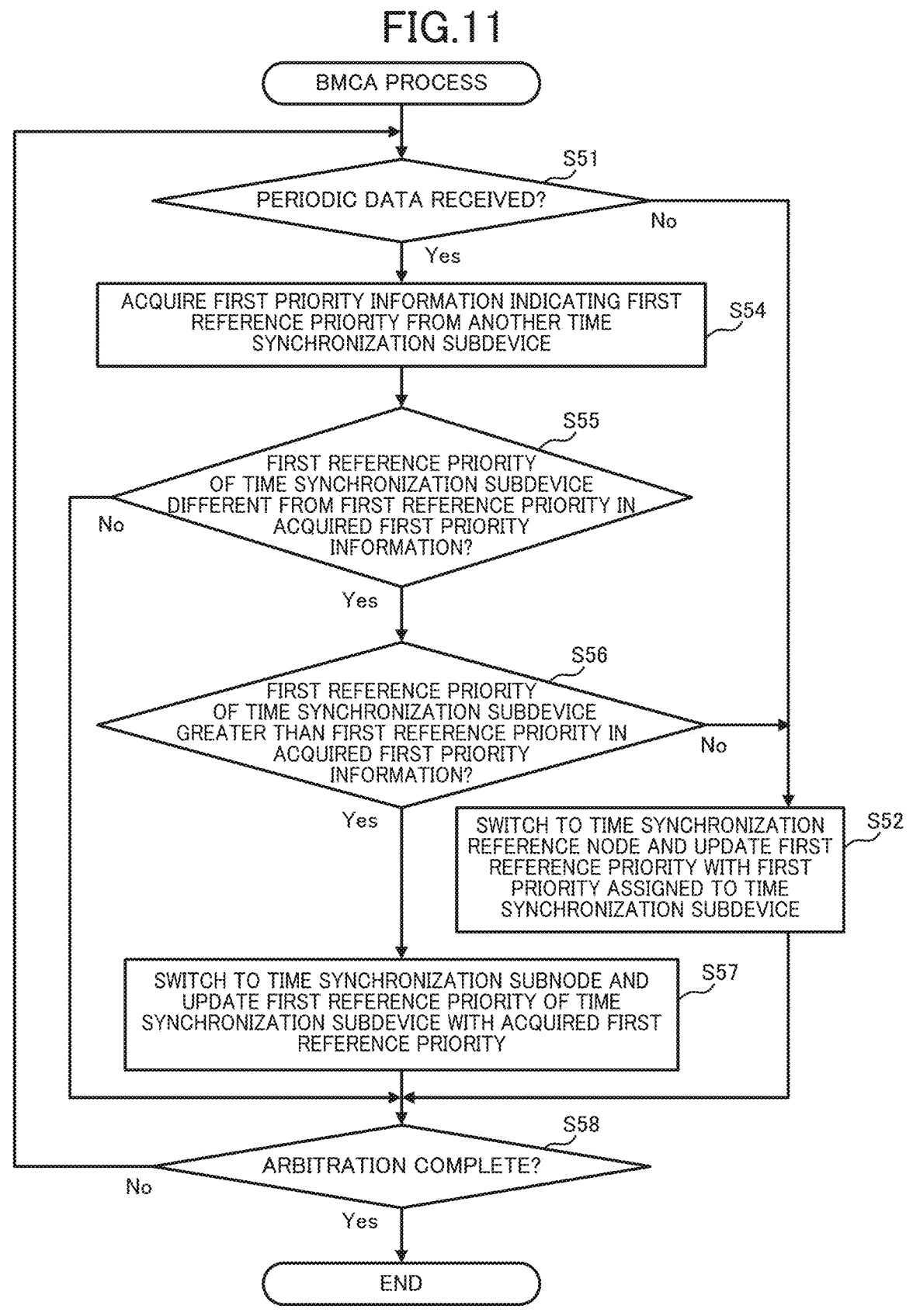

```
                    ┌─────────────────────┐
                    │    BMCA PROCESS     │
                    └─────────────────────┘
                              │
                              ▼
                        ╱╲  S51
                      ╱    ╲
              ╱  PERIODIC DATA RECEIVED?  ╲ ──── No
                      ╲    ╱
                        ╲╱
                         │ Yes
                         ▼
    ┌──────────────────────────────────────────────┐
    │ ACQUIRE FIRST PRIORITY INFORMATION INDICATING  │  S54
    │    FIRST REFERENCE PRIORITY FROM ANOTHER TIME  │
    │         SYNCHRONIZATION SUBDEVICE              │
    └──────────────────────────────────────────────┘
                         │
                         ▼
                      ╱╲  S55
                    ╱    ╲
                  ╱  FIRST REFERENCE PRIORITY  ╲
         No ── ╱   OF TIME SYNCHRONIZATION SUBDEVICE  ╲
                  DIFFERENT FROM FIRST REFERENCE PRIORITY IN
                  ╲   ACQUIRED FIRST PRIORITY   ╱
                    ╲     INFORMATION?    ╱
                      ╲╱
                       │ Yes
                       ▼
                      ╱╲  S56
                    ╱    ╲
                  ╱  FIRST REFERENCE PRIORITY  ╲
                ╱   OF TIME SYNCHRONIZATION SUBDEVICE  ╲ ── No
                 GREATER THAN FIRST REFERENCE PRIORITY IN
                  ╲   ACQUIRED FIRST PRIORITY   ╱
                    ╲     INFORMATION?    ╱
                      ╲╱
                       │ Yes
```

ACQUIRE FIRST PRIORITY INFORMATION INDICATING FIRST REFERENCE PRIORITY FROM ANOTHER TIME SYNCHRONIZATION SUBDEVICE — S54

FIRST REFERENCE PRIORITY OF TIME SYNCHRONIZATION SUBDEVICE DIFFERENT FROM FIRST REFERENCE PRIORITY IN ACQUIRED FIRST PRIORITY INFORMATION? — S55

FIRST REFERENCE PRIORITY OF TIME SYNCHRONIZATION SUBDEVICE GREATER THAN FIRST REFERENCE PRIORITY IN ACQUIRED FIRST PRIORITY INFORMATION? — S56

SWITCH TO TIME SYNCHRONIZATION REFERENCE NODE AND UPDATE FIRST REFERENCE PRIORITY WITH FIRST PRIORITY ASSIGNED TO TIME SYNCHRONIZATION SUBDEVICE — S52

SWITCH TO TIME SYNCHRONIZATION SUBNODE AND UPDATE FIRST REFERENCE PRIORITY OF TIME SYNCHRONIZATION SUBDEVICE WITH ACQUIRED FIRST REFERENCE PRIORITY — S57

ARBITRATION COMPLETE? — S58

END

TIME SYNCHRONIZATION SUBDEVICE, TIME SHARING SYSTEM, TIME SHARING METHOD, AND RECORDING MEDIUM

CROSS-REFERENCE TO RELATED APPLICATION

The present application is based on PCT filing PCT/JP2021/022201, filed Jun. 10, 2021, the entire contents of which are incorporated herein by reference.

TECHNICAL FIELD

The present disclosure relates to a time synchronization subdevice, a time sharing system, a time sharing method, and a program.

BACKGROUND ART

To perform cooperative control over multiple devices through a network at factory automation (FA) sites, the devices are to share synchronized time. Known standards for such time synchronization include IEEE 1588 and IEEE 802.1AS. Under the standards, a device having the best clock accuracy among devices on a network is selected as a grandmaster, or in other words, a time synchronization reference node, through an arbitration process that follows the best master clock algorithm (BMCA).

The BMCA is an algorithm commonly used for comparing priorities assigned to the respective devices in accordance with clock accuracy to determine a device with the highest priority to be a time synchronization reference node. More specifically, each device determines that the device is a time synchronization reference node under a particular condition. Each device having the priority of the current time synchronization reference node provides the priority to another device and compares the priorities. Devices other than the time synchronization reference node are time synchronization subnodes that are subordinate to the time synchronization reference node. Time in a time synchronization subnode synchronizes with the time distributed from the selected time synchronization reference node.

When the time synchronization reference node is disconnected from the network, the time synchronization subnodes on the network perform the BMCA and select a new time synchronization reference node. Before selecting a new time synchronization reference node, the time synchronization subnodes cannot synchronize time with a time synchronization reference node. Thus, the time synchronization subnodes use clocks included in the time synchronization subnodes to measure time. Multiple time synchronization subnodes typically have different levels of clock accuracy. This generates a difference of time between the time synchronization subnodes. On the network with more nodes corresponding to devices, selecting a time synchronization reference node takes longer time, and the time difference between time synchronization subnodes is greater. Thus, the time synchronization subnodes that synchronize time with a new time synchronization reference node may have, at the point of starting synchronization, discontinuity in the measured time or may undergo abnormal synchronization.

A technique has been developed to reduce such instability in time synchronization (see, for example, Patent Literatures 1 and 2). Patent Literatures 1 and 2 describe a network device located between a grandmaster and a subnetwork continuously performing, upon the grandmaster being removed or crashed, timing synchronization with slave nodes in the subnetwork based on timing information about the network device.

CITATION LIST

Patent Literature

Patent Literature 1: Unexamined Japanese Patent Application Publication No. 2010-103970
Patent Literature 2: Unexamined Japanese Patent Application Publication No. 2013-85278

SUMMARY OF INVENTION

Technical Problem

When subnetwork devices attempt to perform the BMCA, the techniques described in Patent Literatures 1 and 2 cause a network device to ignore the result of the BMCA process in the subnetwork, and the network device is forcibly set as a time synchronization reference node in the subnetwork.

When the techniques described in Patent Literatures 1 and 2 are used in a network structure including multiple paths from time synchronization subdevices as time synchronization subnodes to a time synchronization reference node, multiple network devices adjacent to the time synchronization reference node forcibly distribute time upon disconnection of the time synchronization reference node connected to the multiple network devices. Thus, time synchronization referencing to a single clock is not performed. When the multiple network devices have different levels of clock accuracy, the distributed time gradually includes a greater error. The time synchronization subdevices may cause an abnormality in time to be synchronized.

In response to the above issue, an objective of the present disclosure is to allow the network structure including multiple paths from time synchronization subdevices to a time synchronization reference node to avoid abnormal time synchronization upon disconnection of the time synchronization reference node.

Solution to Problem

To achieve the above objective, a time synchronization subdevice according to an aspect of the present disclosure is a time synchronization subdevice for sharing shared time with a time synchronization reference device and relaying distribution of the shared time to another time synchronization subdevice. The time synchronization reference device is a time synchronization reference node to distribute the shared time. The time synchronization subdevice includes periodic data receiving means for receiving periodic data transmitted periodically from the time synchronization reference device, acquisition means for acquiring first priority information indicating a first priority assigned to the time synchronization reference device and indicating a degree of priority in selecting the time synchronization reference node, first priority transmitting means for transmitting, when the periodic data received by the periodic data receiving means is interrupted, the first priority information to be transmitted with the periodic data being continuously received to the another time synchronization subdevice, second priority information transmitting means for transmitting, when the periodic data is interrupted, transmission information indicating a second priority assigned to the time synchronization subdevice to the another time synchronization subdevice, second priority information receiving means for receiving, from the another time synchronization subdevice, reception information indicating a second priority assigned to a device different from the time synchronization subdevice, and distribution means for distributing, when the periodic data is interrupted and the second priority indicated with the transmission information is higher than the second priority indicated with the reception information, time measured by clocking means different from the time synchronization reference device as new shared time to the another time synchronization subdevice. The first priority transmitting means stops transmitting the first priority information when the second priority indicated with the transmission information is lower than the second priority indicated with the reception information.

Advantageous Effects of Invention

In the structure according to the above aspect of the present disclosure, a network structure including multiple paths from a time synchronization subdevice to a time synchronization reference node can avoid abnormal time synchronization upon disconnection of the time synchronization reference node.

BRIEF DESCRIPTION OF DRAWINGS

FIG. 4 is a diagram describing example priorities assigned to the communication devices in the embodiment;

FIG. 11 is a flowchart of a BMCA process performed by the time synchronization subdevice according to the embodiment.

DESCRIPTION OF EMBODIMENTS

A time sharing system according to one or more embodiments of the present disclosure is described in detail with reference to the drawings. Time sharing and synchronization among multiple devices refers to synchronization of clocks included in the respective devices. When having the clocks each measuring the same time and sharing the measured time, the respective devices are synchronized.

Embodiments

Figure 1:
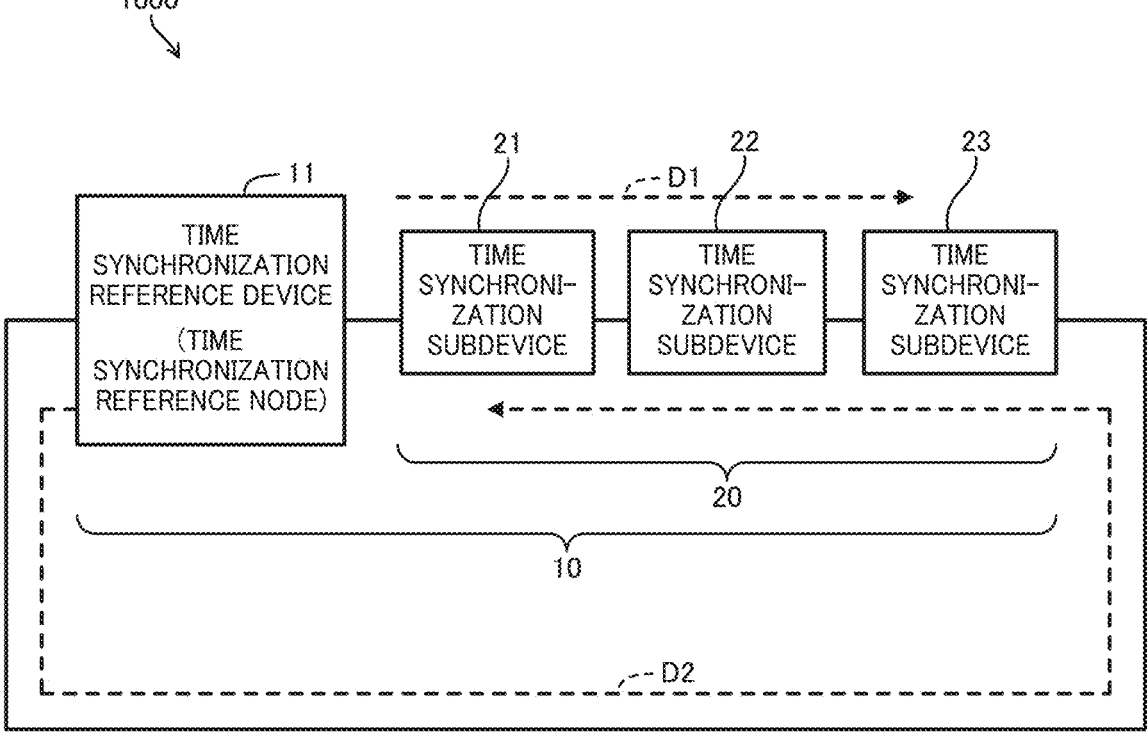
FIG. 1 is a block diagram of a time sharing system according to an embodiment.

A time sharing system 1000 according to the present embodiment corresponds to a production system, an inspection system, a machining system, or another system serving as a factory automation (FA) system installed at a factory. As illustrated in FIG. 1, the time sharing system 1000 includes a time synchronization reference device 11 corresponding to a time synchronization reference node that distributes time, and time synchronization subdevices 21, 22, and 23 corresponding to time synchronization subnodes that share time with the time synchronization reference device 11. In the structure of the time sharing system 1000, if the BMCA is performed upon disconnection of the time synchronization reference device 11, a new time synchronization reference node is selected from all the time synchronization subdevices 21 to 23. However, the time sharing system 1000 narrows, without performing the BMCA, candidates for a new time synchronization reference node to the time synchronization subdevices 21 and 23 that first detect the disappearance of the time synchronization reference node, and selects a single time synchronization reference node from the candidates. Hereafter, the time synchronization subdevices 21 to 23 are generically referred to as time synchronization subdevices 20 as appropriate. The time synchronization reference device 11 and the time synchronization subdevices 20 are generically referred to as communication devices 10 as appropriate.

The time sharing system 1000 is a ring network system. The communication devices 10 form a ring network. In other words, the time synchronization reference device 11 and each of the time synchronization subdevices 21 and 23 are connected with network cables to communicate with each other. The time synchronization subdevice 21 and each of the time synchronization reference device 11 and the time synchronization subdevice 22 are connected through network cables to communicate with each other. The time synchronization subdevice 22 and the time synchronization subdevices 21 and 23 are connected through network cables to communicate with each other. The time synchronization subdevice 23 and each of the time synchronization subdevice 22 and the time synchronization reference device 11 are connected through network cables to communicate with each other.

The communication devices 10 in the time sharing system 1000 are connected in a ring connection supporting multiple domains. A domain herein refers to the range of communication for a communication device 10 to share time with other devices. When communication is disabled due to an abnormality in one device or when one of the lines on the network is disconnected, other devices can continue to communicate. In this manner, the time sharing system 1000 has communication path redundancy. More specifically, any of the time synchronization subdevices 20 acquires shared time distributed from the time synchronization reference device 11 in each of domains D1 and D2. The domain D1 corresponds to an example of a first path extending from the time synchronization reference device 11 to each of the time synchronization subdevices 20. The domain D2 corresponds to an example of a second path different from the first path.

Figure 2:
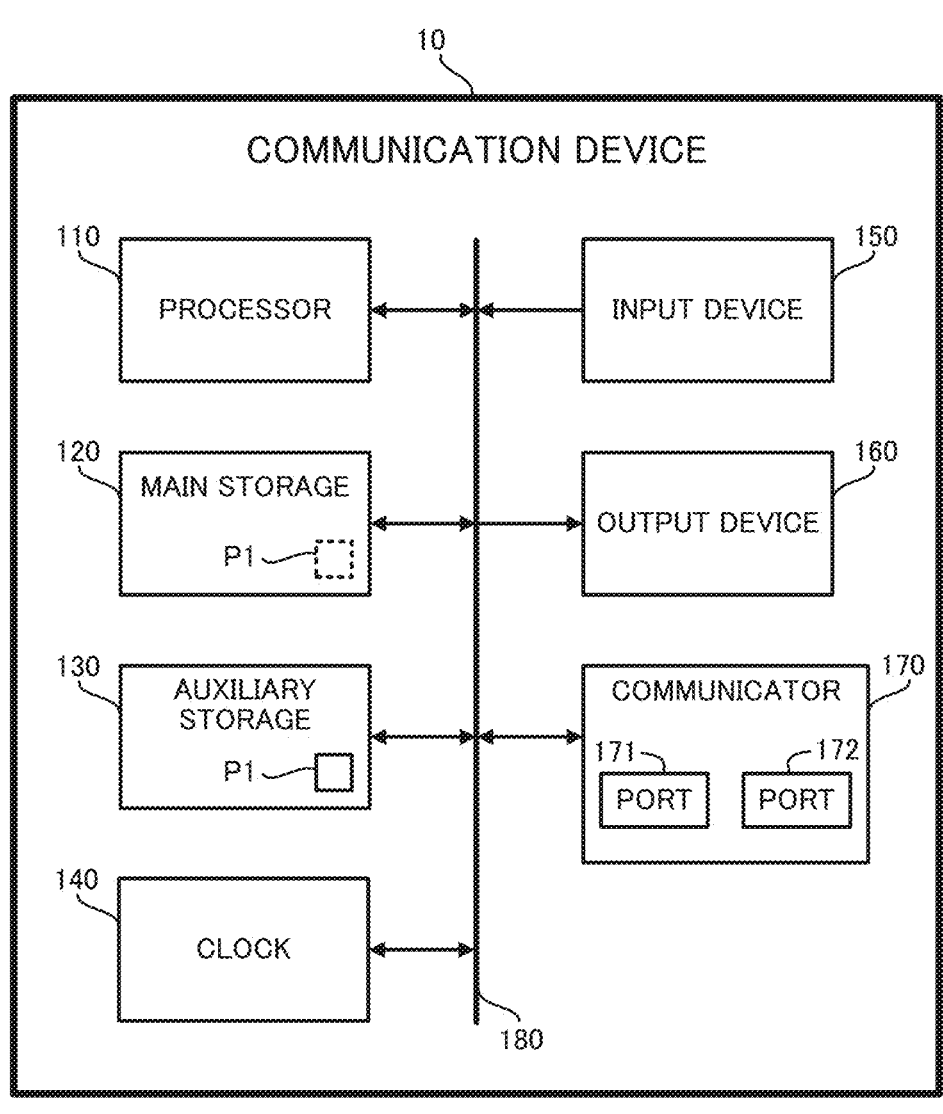
FIG. 2 is a block diagram of a communication device in the embodiment, illustrating the hardware configuration.

Each communication device 10 may be, for example, a programmable logic controller (PLC) or a communication unit in a PLC, a sensor, an actuator, a motor, a robot, or another FA device. As illustrated in FIG. 2, the communication device 10 includes, as hardware components, a processor 110, a main storage 120, an auxiliary storage 130, a clock 140, an input device 150, an output device 160, and a communicator 170. The processor 110 is connected to the main storage 120, the auxiliary storage 130, the clock 140, the input device 150, the output device 160, and the communicator 170 with an internal bus 180.

The processor 110 includes a central processing unit (CPU) or a micro processing unit (MPU) that is an integrated circuit. The processor 110 executes a program P1 stored in the auxiliary storage 130 to implement various functions of the communication device 10 and perform the processes (described later).

The main storage 120 includes a random-access memory (RAM). The main storage 120 stores the program P1 loaded from the auxiliary storage 130. The main storage 120 is used as a work area by the processor 110.

The auxiliary storage 130 includes a non-volatile memory, typically an electrically erasable programmable read-only memory (EEPROM). The auxiliary storage 130 stores, in addition to the program P1, various data items used in the processing performed by the processor 110. The auxiliary storage 130 provides data usable by the processor 110 to the processor 110 as instructed by the processor 110, and stores data provided by the processor 110.

The clock 140 includes a clock generator including a quartz resonator. The clock 140 generates a clock signal based on the oscillation frequency of the quartz resonator, and outputs the clock signal. The clock signal includes a clock pulse, and is used, for example, by the processor 110 to measure time by counting the number of times the clock pulse rises.

The input device 150 includes devices for input, typically input keys, buttons, and switches. The input device 150 acquires information input by a user of the communication device 10, and provides the acquired information to the processor 110.

The output device 160 includes devices for output, typically a light-emitting diode (LED) and a speaker. The output device 160 presents various items of information to the user as instructed by the processor 110.

The communicator 170 includes a network interface circuit for communicating with external devices, and ports 171 and 172 for network cables to be attached and detached. The communicator 170 receives an Ethernet frame from an external device through the ports 171 and 172, and outputs information included in the frame to the processor 110. The communicator 170 transmits an Ethernet frame including information output from the processor 110 to an external device through the ports 171 and 172. One of the ports 171 or 172 is a terminal for distributing shared time along the arrow indicating the domain D1 illustrated in FIG. 1. The other port is a terminal for distributing the shared time along the arrow indicating the domain D2. The time synchronization subdevice 21 is connected to the time synchronization reference device 11 through one of the ports 171 or 172, although shared time provided from the time synchronization subdevice 22 may not be provided to the time synchronization reference device 11 in the domain D2. Similarly, the time synchronization subdevice 23 is connected to the time synchronization reference device 11 through one of the ports 171 or 172.

With the hardware components described above operating in cooperation, the time synchronization reference device 11 and the time synchronization subdevices 20 perform various functions. More specifically, the time synchronization reference device 11 distributes shared time in accordance with the precision time protocol (PTP). The PTP is a protocol for synchronizing time in each device connected to a network. In accordance with the PTP, a time synchronization reference node distributes highly accurate time. Receiving the shared time, a time synchronization subdevice 20 synchronizes the time with the time of the time synchronization reference node. The time synchronization subdevice 20 relays distribution of the shared time shared with the time synchronization reference device 11 to the other time synchronization subdevices 20. For example, the time synchronization subdevice 21 relays distribution of the shared time to the time synchronization subdevices 22 and 23 in the domain D1. The time synchronization subdevice 23 relays distribution of the shared time to the time synchronization subdevice 22 and 21 in the domain D2.

Figure 3:
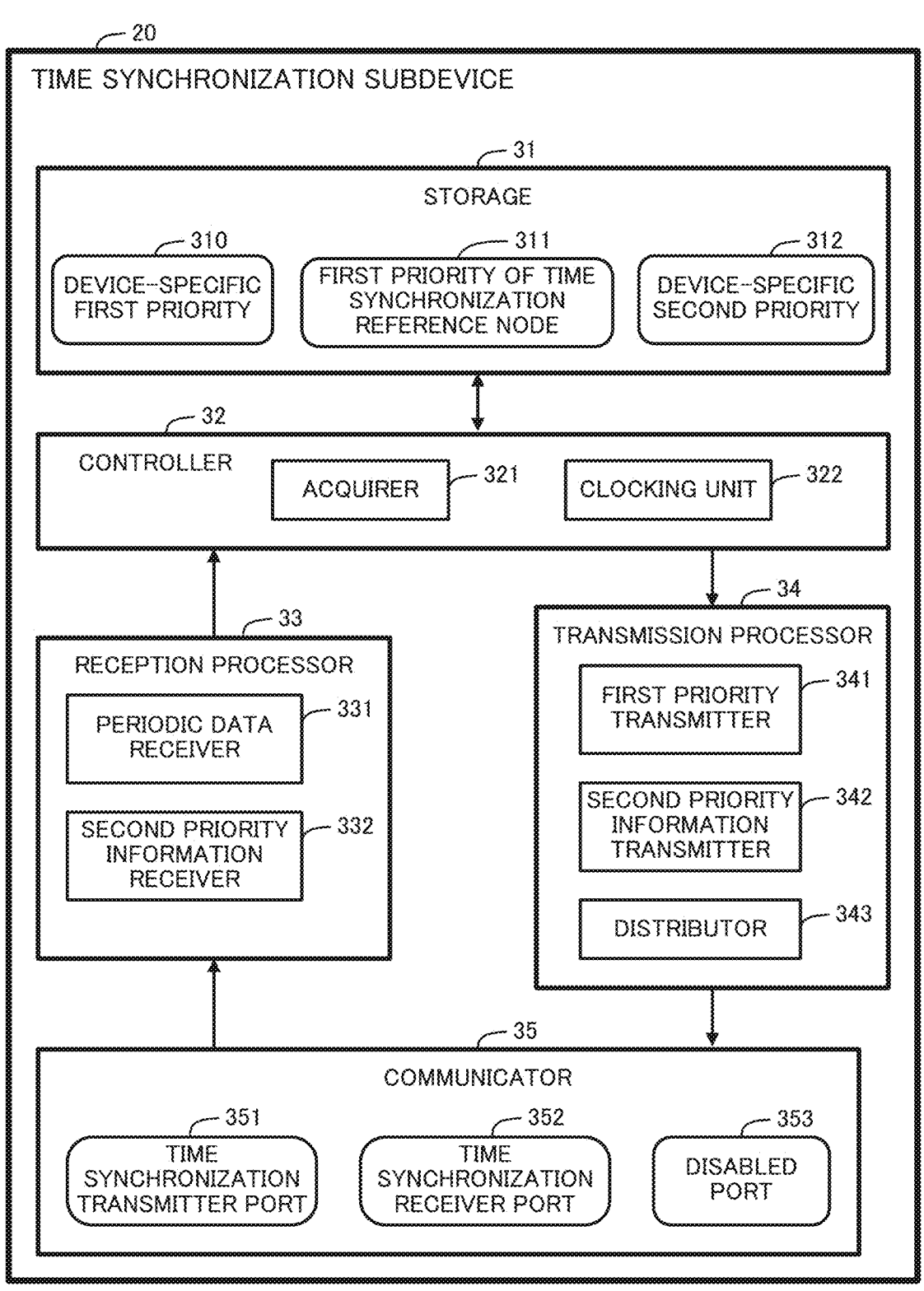
FIG. 3 is a functional block diagram of a time synchronization subdevice according to the embodiment.

As illustrated in FIG. 3, the time synchronization subdevice 20 includes, as functional components, a storage 31 for storing various items of information, a controller 32 for centrally controlling components in the time synchronization subdevice 20, a reception processor 33 for performing processing associated with data received from an external device, a transmission processor 34 for performing processing associated with data to be transmitted to an external device, and a communicator 35 for communicating with an external device.

The storage 31 is mainly implemented by at least one of the main storage 120 or the auxiliary storage 130. The storage 31 stores priorities indicating the degree of priority in selecting a time synchronization reference node. More specifically, the storage 31 stores a device-specific first priority 310 preassigned to the time synchronization subdevice 20, a first priority 311 of the time synchronization reference node currently stored in the time synchronization subdevice 20, and a device-specific second priority 312 preassigned to the time synchronization subdevice 20.

The device-specific first priority 310 is preassigned to the time synchronization subdevice 20 in accordance with the clock accuracy. The device-specific first priority 310 and the first priority 311 of the time synchronization reference node are used in the BMCA. Hereafter, the first priority of the time synchronization reference node is referred to as a first reference priority as appropriate. The first priority represents the order of priority. A device assigned with a smaller value in the order of priority is selected preferentially as a time synchronization reference node than a device assigned with a greater value in the order of priority.

The device-specific second priority 312 may be preset in the time synchronization subdevice 20, or may be changed by the user of the time synchronization subdevice 20. The device-specific second priority 312 is used to select a new time synchronization reference node without performing the BMCA. The second priority may be equal to the first priority, or may be defined in a format different from a format of the first priority. For example, when the second priority is an Internet Protocol (IP) address of a time synchronization subdevice 20, a device having an address of a smaller value may be preferentially selected as a new time synchronization reference node over a device having an address of a greater value. Different second priorities are preassigned to different devices. No multiple devices receive the same priority.

FIG. 4 illustrates example priorities stored in the respective devices when the time synchronization reference device 11 being the time synchronization reference node distributes shared time to the time synchronization subdevices 21 to 23. The first priority of 1 assigned to the time synchronization reference device 11 is smaller than any of the first priorities of 2, 3, and 4 assigned to the time synchronization subdevices 21 to 23, indicating that the time synchronization reference device 11 is to be a time synchronization reference node. Any of the first reference priorities stored in the time synchronization reference device 11 and the time synchronization subdevices 21 to 23 is equal to 1 that is the priority assigned to the time synchronization reference device 11 being a time synchronization reference node. In the example in FIG. 4, the second priority assigned to each device is equal to the first priority assigned to the device. For example, the second priority assigned to the time synchronization subdevice 21 is equal to 2 that is the first priority assigned to the time synchronization subdevice 21.

Referring back to FIG. 3, the controller 32 is mainly implemented by the processor 110. The controller 32 includes an acquirer 321 for acquiring a first reference priority provided from another device, and a clocking unit 322 for measuring time. With the BMCA, the first reference priority acquired by the acquirer 321 is compared with the first reference priority stored in the storage 31. The clocking unit 322 is used to synchronize time with the time synchronization reference node. When the time synchronization reference device 11 is disconnected from the network and causes the time synchronization subdevice 20 to be a new time synchronization reference node, the clocking unit 322 is used to generate new shared time. In the time synchronization subdevice 20, the acquirer 321 corresponds to an example of acquisition means for acquiring first priority information indicating the first priority assigned to the time synchronization reference device. The clocking unit 322 corresponds to an example of clocking means that measures time and is different from the time synchronization reference device.

The communicator 35 is mainly implemented by the communicator 170. The communicator 35 assigns each of the ports 171 and 172 to be one of a time synchronization transmitter port 351, a time synchronization receiver port 352, and a disabled port 353.

The ports 171 and 172 of a time synchronization reference node are both set to be time synchronization transmitter ports. The time synchronization transmitter port transmits a synchronous frame and an arbitration frame. The synchronous frame is data indicating shared time and includes, for example, a sync message and a Follow_UP message. The arbitration frame is also referred to as an Announce message. The arbitration frame indicates information about devices sharing shared time. More specifically, the arbitration frame includes the first priority information indicating the first reference priority of the device transmitting the arbitration frame. To perform the BMCA upon disconnection of the time synchronization reference node, the arbitration frame is repeatedly transmitted in periods longer than the transmission period of the synchronous frame. A communication device 10 receiving an arbitration frame through the time synchronization transmitter port performs a comparison between the first reference priority indicated with the arbitration frame and the first reference priority stored in the communication device 10. A communication device 10 receiving a synchronous frame through the time synchronization transmitter port does not synchronize with the time indicated with the synchronous frame.

Communication devices 10 other than the time synchronization reference node each include a single time synchronization receiver port. The time synchronization receiver port transmits neither a synchronous frame nor an arbitration frame. A communication device 10 receiving an arbitration frame through the time synchronization receiver port performs a comparison between the first reference priority indicated with the arbitration frame and the first reference priority stored in the communication device 10. A communication device 10 receiving a synchronous frame through the time synchronization receiver port synchronizes with the time indicated with the synchronous frame.

The disabled port transmits neither a synchronous frame nor an arbitration frame. A communication device 10 receiving an arbitration frame through the disabled port performs no comparison on first priorities or first reference priorities. A communication device 10 receiving a synchronous frame through the disabled port does not synchronize with the time indicated with the synchronous frame.

Figure 5:
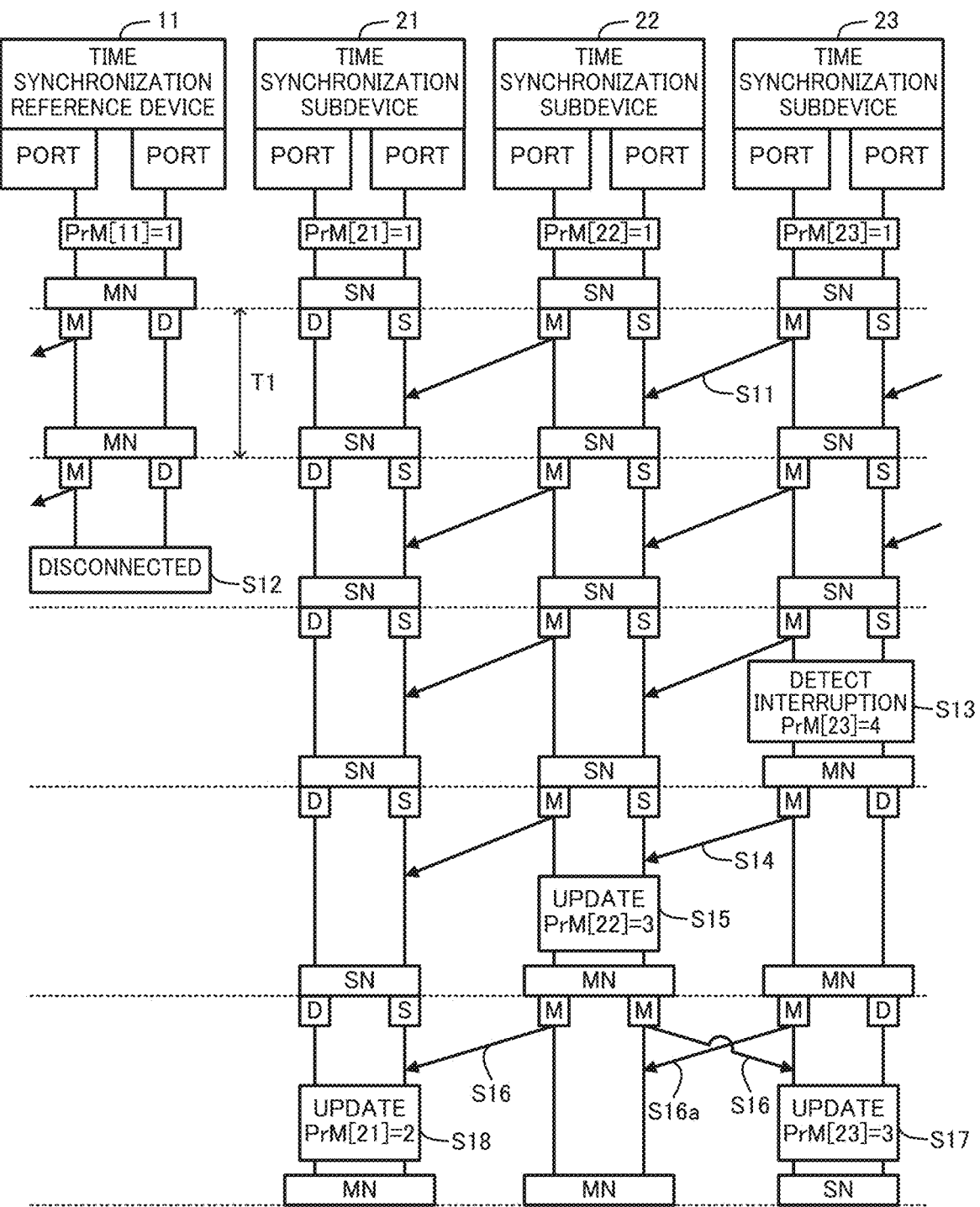
FIG. 5 is a first diagram describing communications with the BMCA being used in the time sharing system according to the embodiment.
Figure 6:
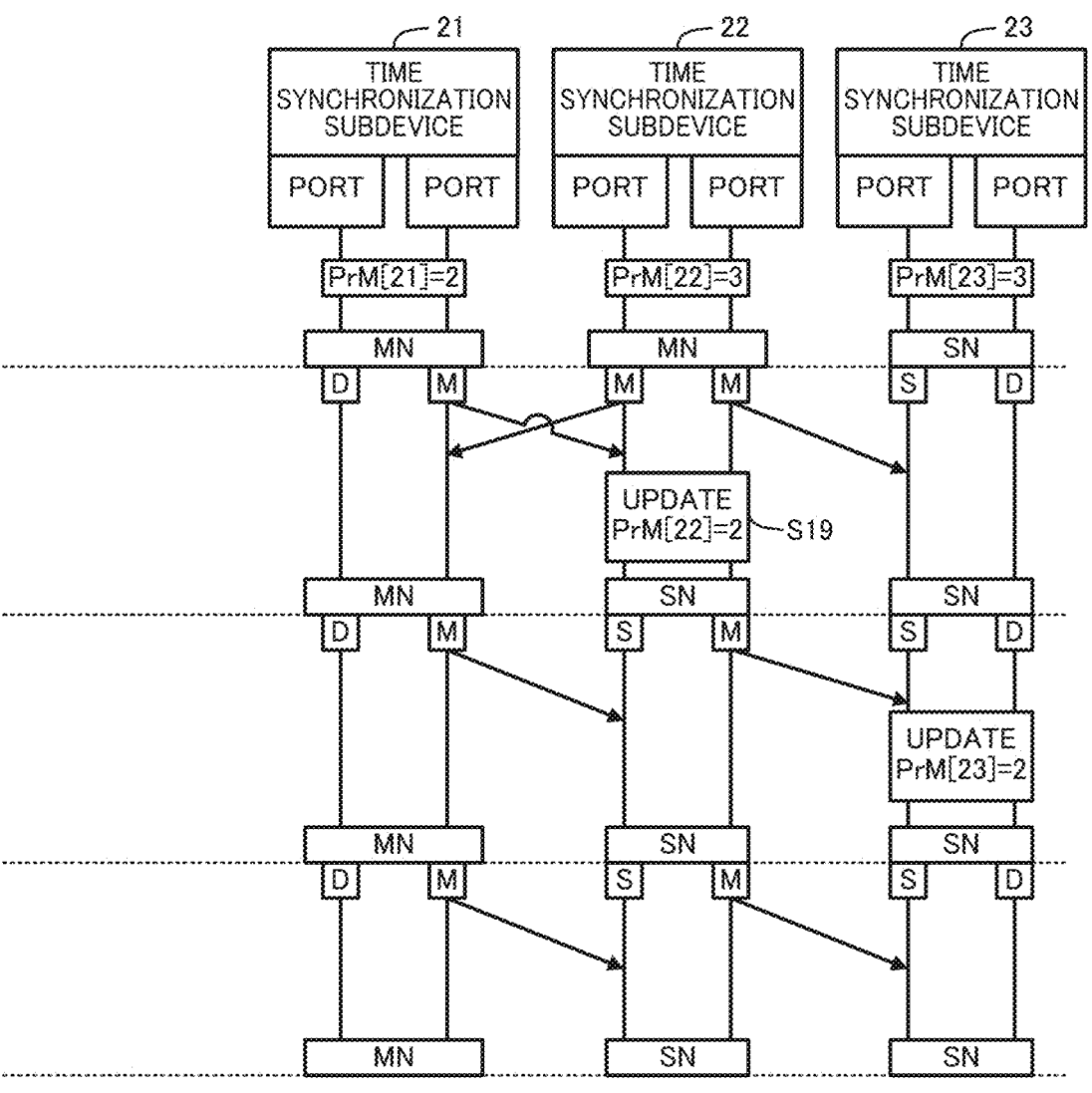
FIG. 6 is a second diagram describing communications with the BMCA being used in the time sharing system according to the embodiment.

An overview of the BMCA is now described with reference to FIGS. 5 to 7. FIG. 5 illustrates the procedure of communications when the BMCA is performed in the domain D2 of the time sharing system 1000. In FIG. 5, PrM[*]=N indicates that a device with an identification number of * stores the value of the first reference priority being N. For example, PrM[11]=1 indicates that the time synchronization reference device 11 stores the first reference priority being 1. The identification numbers for the respective devices are equal to the reference numerals assigned to these devices. MN indicates a time synchronization reference node, or a main node. SN indicates a time synchronization subnode.

In the domain D2, the time synchronization reference device 11 and the time synchronization subdevices 22 and 23 each transmit an arbitration frame regularly in periods of T1 in accordance with the PTP. The arbitration frame indicates information for performing arbitration through the BMCA. The arbitration frame is transmitted from the time synchronization transmitter port, indicated as M, of the time synchronization reference device 11 and the time synchronization subdevices 22 and 23 to the time synchronization receiver port, indicated as S, of a subdevice. In FIG. 5, a solid arrow indicates transmission of an arbitration frame. In FIG. 5, D indicates a disabled port. The arbitration frame transmitted in step S11 in FIG. 5 includes first priority information indicating the first reference priority of 1 of the time synchronization subdevice 23.

In step S12, the time synchronization reference device 11 is disconnected and disappears. In step S13, the time synchronization subdevice 23 detects the interruption of data to be received from the time synchronization reference device 11, and updates the first reference priority to 4. In other words, instead of the first priority of the disappearing time synchronization reference device 11, the first priority of the time synchronization subdevice 23 is set as a first reference priority indicating the first priority of a new time synchronization reference node.

The arbitration frame transmitted in subsequent step S14 includes first priority information indicating 4 that is the first reference priority of the time synchronization subdevice 23. The first reference priority of 1 of the time synchronization subdevice 22 is prioritized over the first reference priority of 4 indicated with the first priority information. Upon receiving the arbitration frame, the time synchronization subdevice 22 sets the subdevice as a new time synchronization reference node, and updates the stored first reference priority to 3 in step S15.

In step S16, the time synchronization subdevice 22 being a new time synchronization reference node transmits an arbitration frame to each of the time synchronization subdevices 21 and 23. The first reference priority of 3 indicated with the first priority information is prioritized over the first reference priority of 4 stored in the time synchronization subdevice 23 being a time synchronization reference node. Upon receiving the arbitration frame, the time synchronization subdevice 23 sets the subdevice as a time synchronization subnode, and updates the stored first reference priority to 3 in step S17. In step S16a occurring at the same time as step S16, the time synchronization subdevice 23 being a time synchronization reference node transmits an arbitration frame from the M port to the time synchronization subdevice 22.

Similarly to the time synchronization subdevice 22 in step S15, upon receiving the arbitration frame from the time synchronization subdevice 22, the time synchronization subdevice 21 sets the subdevice as a time synchronization reference node, and updates the stored first reference priority with the device-specific first priority in step S18. At this point, each of the time synchronization subdevices 21 and 22 determines the subdevice as a time synchronization reference node.

Subsequently, similarly to the time synchronization subdevice 23 in step S17, the time synchronization subdevice 22 sets the subdevice as a time synchronization subnode and updates the stored first reference priority with the first reference priority indicated with the provided first priority information in step S19 illustrated in FIG. 6. Subsequent transmission of the arbitration frame and updates of the first reference priority cause the time synchronization subdevice 21 to be a single time synchronization reference node. The first reference priorities stored in the time synchronization subdevices 21 to 23 are to be 2 that is equal to the first priority of the time synchronization subdevice 21. The time synchronization subdevice 21 thereafter distributes shared time as the new time synchronization reference node.

Figure 7:
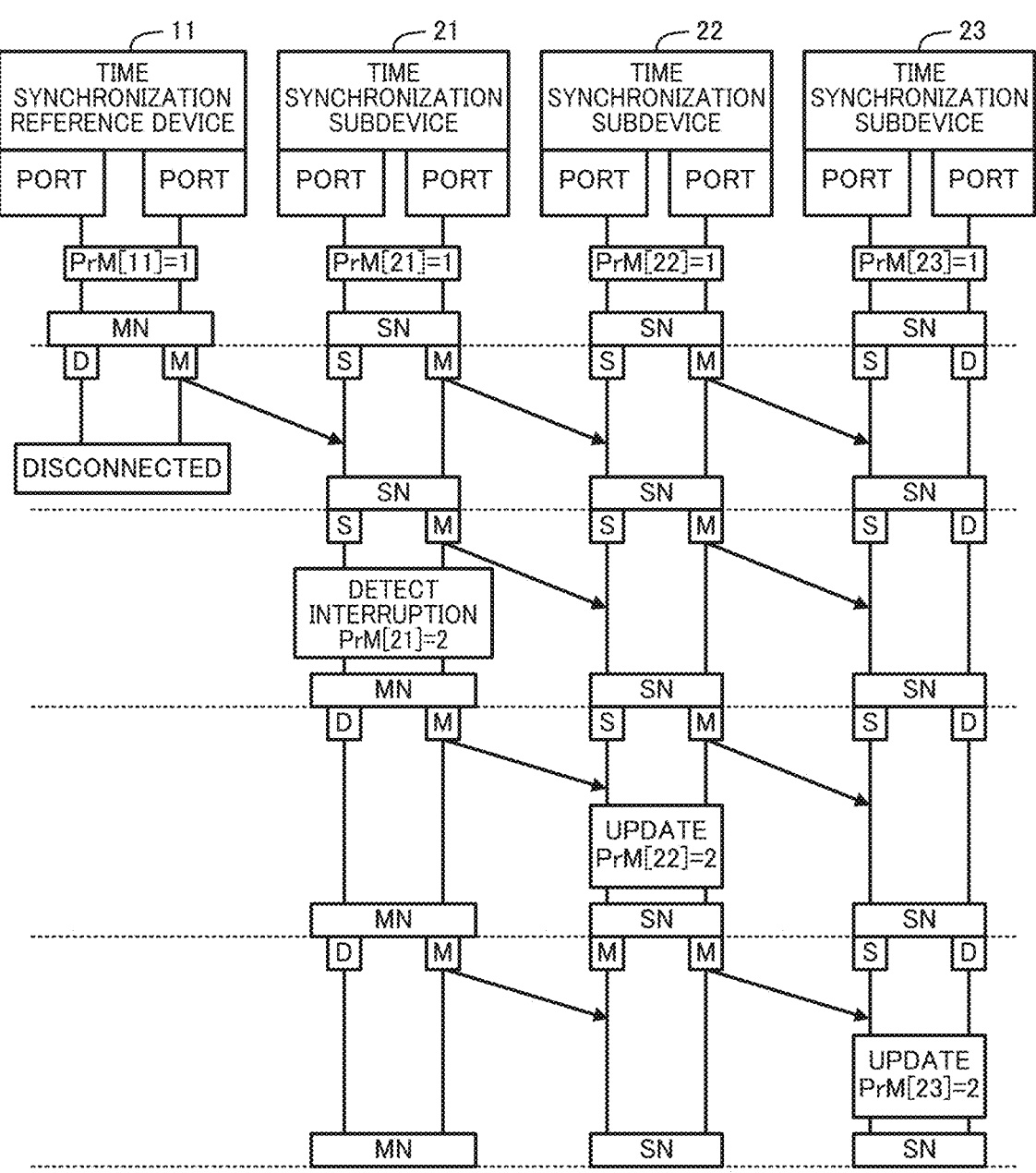
FIG. 7 is a third diagram describing communications with the BMCA being used in the time sharing system according to the embodiment.

FIG. 7 illustrates an overview of communications in the domain D1. In the domain D1 after disconnection of the time synchronization reference device 11, the arbitration frame is transmitted and the first reference priority is updated as in the domain D2, causing the time synchronization subdevice 21 to be a single new time synchronization reference node. As described above, the first reference priority is used in the BMCA to select a single time synchronization reference node. As indicated with FIGS. 5 to 7, selecting a new time synchronization reference node with the BMCA takes several times as long as the period T1 or longer. The selection takes longer time with more communication devices 10.

Referring back to FIG. 3, the reception processor 33 is mainly implemented by the processor 110. The reception processor 33 includes a periodic data receiver 331 for receiving periodic data transmitted periodically from the time synchronization reference node and a second priority information receiver 332 for receiving second priority information indicating a second priority assigned to another device.

The periodic data receiver 331 receives periodic data through the communicator 35. More specifically, the periodic data receiver 331 receives periodic data along two paths separately. For example, the periodic data receiver 331 in the time synchronization subdevice 21 receives periodic data transmitted from the time synchronization reference device 11 and along the domain D1 as well as periodic data along the domain D2 through the other time synchronization subdevice 22. The periodic data may be an arbitration frame described above, a synchronous frame, another type of time synchronization data about shared time, or data periodically transmitted independently of shared time. The periodic data may be transmitted at regular intervals or at varying intervals. The periodic data may be any data transmitted every periodic time division. Disconnection of the time synchronization reference node from the network causes interruption of periodic data to be received at the periodic data receiver 331. In the time synchronization subdevice 20, the periodic data receiver 331 corresponds to an example of periodic data receiving means for receiving periodic data.

The second priority information receiver 332 receives, through the communicator 35, second priority information that is transmitted from another device detecting the interruption of periodic data and indicates the second priority of the other device. The time synchronization subdevices 21 and 23 detect the interruption of periodic data from the time synchronization reference node. The second priority information is transmitted between the time synchronization subdevices 21 and 23. The time synchronization subdevices 21 and 23 are candidates for a time synchronization reference node. One of the time synchronization subdevices 21 or 23 is selected as a new time synchronization reference node based on the second priority information. In the time synchronization subdevice 20, the second priority information receiver 332 corresponds to an example of second priority information receiving means for receiving, from another time synchronization subdevice, reception information indicating a second priority assigned to a device different from the time synchronization subdevice 20. The second priority information received at the second priority information receiver 332 corresponds to an example of reception information received by the second priority information receiving means. For example, the second priority information receiver 332 in the time synchronization subdevice 21 receives, from the time synchronization subdevice 22, reception information indicating the second priority assigned to the time synchronization subdevice 23 different from the time synchronization subdevice 21.

The transmission processor 34 is mainly implemented by the processor 110. The transmission processor 34 includes a first priority transmitter 341, a second priority information transmitter 342, and a distributor 343. When periodic data is interrupted, the first priority transmitter 341 transmits the same first priority information as the first priority information before the interruption. When periodic data is interrupted, the second priority information transmitter 342 transmits second priority information indicating the device-specific second priority. When periodic data is interrupted, the distributor 343 distributes shared time to the other time synchronization subdevices 20.

When the periodic data receiver 331 receives periodic data along each of the two paths, the first priority transmitter 341 generates an arbitration frame including first priority information indicating the first reference priority stored in the time synchronization subdevice 20, and transmits the arbitration frame to another time synchronization subdevice 20 through the communicator 35. When periodic data from the time synchronization reference node is interrupted, the first priority transmitter 341 transmits first priority information that does not allow any other time synchronization subdevices 20 to perform the BMCA. As illustrated in FIG. 5, a change in first priority information included in an arbitration frame triggers the BMCA. Thus, maintaining transmission of the same first priority information as the first priority information before the interruption prevents the BMCA from being performed. In the time synchronization subdevice 20, the first priority transmitter 341 corresponds to an example of first priority transmitting means for transmitting, when the periodic data received by the periodic data receiving means is interrupted, first priority information to be transmitted with the periodic data being continuously received to another time synchronization subdevice. For example, when the periodic data from the time synchronization reference device 11 is interrupted, the first priority transmitter 341 in the time synchronization subdevice 21 transmits, to the time synchronization subdevice 22, the first priority information to be transmitted with the periodic data being received continuously.

When the reception processor 33 detects the interruption of periodic data, the second priority information transmitter 342 reads the second priority stored in the storage 31, generates second priority information indicating the second priority, and transmits the second priority information to another time synchronization subdevice 20 through the communicator 35. In the time synchronization subdevice 20, the second priority information transmitter 342 corresponds to an example of second priority information transmitting means for transmitting, when periodic data is interrupted, transmission information indicating the second priority assigned to the time synchronization subdevice 20 to another time synchronization subdevice. The second priority information transmitted from the second priority information transmitter 342 corresponds to an example of transmission information transmitted from the second priority information transmitting means.

The distributor 343 distributes time measured by the clocking unit 322 to another time synchronization subdevice 20 when the reception processor 33 detects the interruption of periodic data. The time synchronization subdevices 21 and 23 detecting the interruption of periodic data are to be candidates for a new time synchronization reference node. The distributors 343 in the time synchronization subdevices 21 and 23 are to temporarily distribute shared time. The distributor 343 may start distributing shared time after the time synchronization subdevice 20 including the distributor 343 is selected as a new time synchronization reference node from the candidates for a time synchronization reference node. In the time synchronization subdevice 20, the distributor 343 corresponds to an example of distribution means for distributing new shared time to another time synchronization subdevice 20. The distributor 343 may relay distribution of shared time from a time synchronization reference node. For example, the distributor 343 in the time synchronization subdevice 23 may acquire a synchronous frame distributed from the time synchronization reference device 11 through the communicator 35 and the reception processor 33, and may transmit the synchronous frame to the time synchronization subdevice 22.

Figure 8:
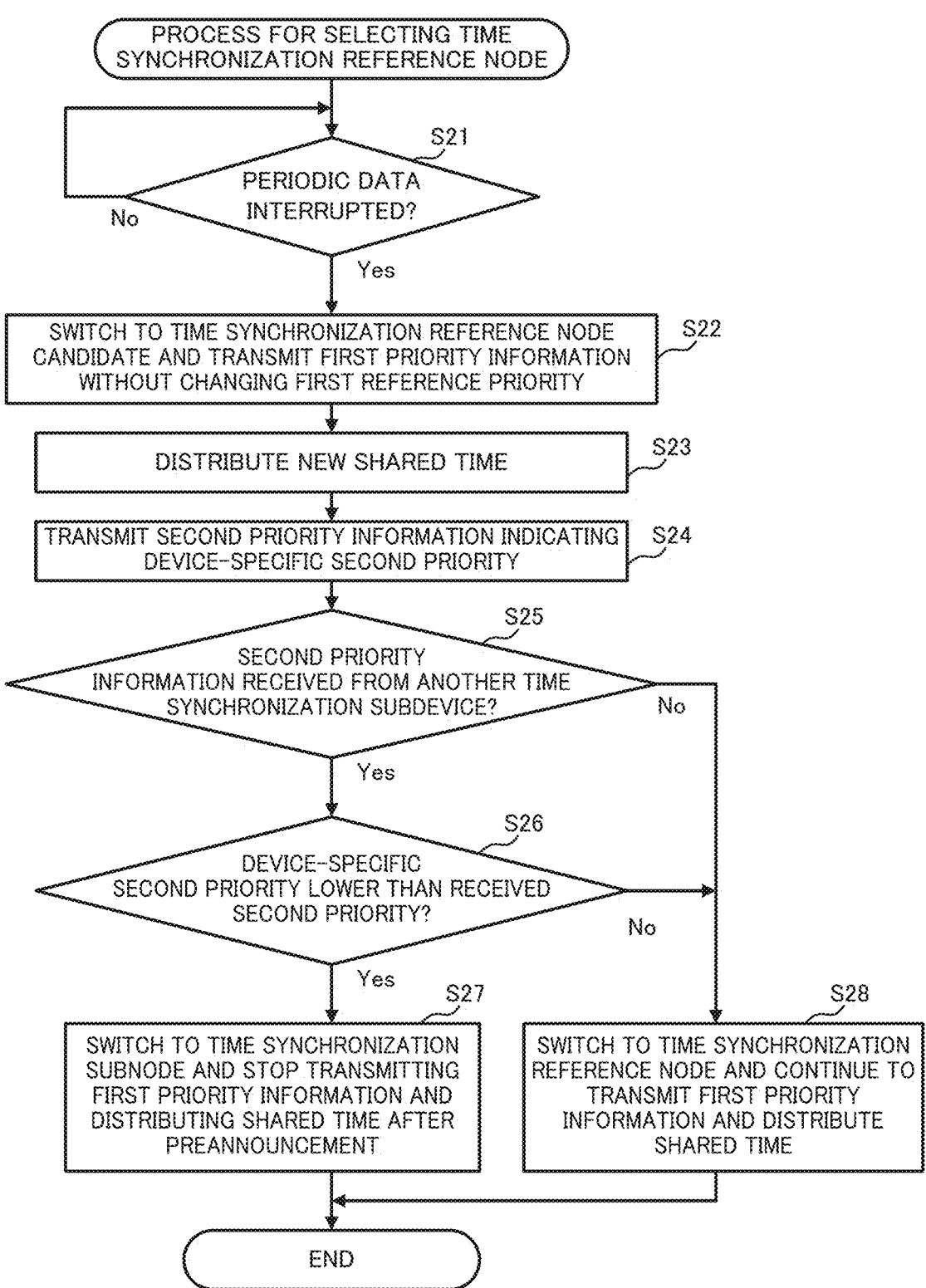
FIG. 8 is a flowchart of a process for selecting a time synchronization reference node in the embodiment.

A process for selecting a time synchronization reference node performed by a time synchronization subdevice 20 is described with reference to FIG. 8. The process for selecting a time synchronization reference node illustrated in FIG. 8 starts when the time synchronization subdevice 20 is powered on. The process for selecting a time synchronization reference node may be performed at any selected time other than the time described above. When a time synchronization reference node is disconnected from a network, the process for selecting a time synchronization reference node allows selecting a new time synchronization reference node without performing the BMCA, while maintaining synchronization of time. An example process for selecting a time synchronization reference node performed by the time synchronization subdevice 21 is mainly described below.

In the process for selecting a time synchronization reference node, the periodic data receiver 331 determines whether reception of periodic data is interrupted (step S21). For example, the periodic data receiver 331 in the time synchronization subdevice 21 determines whether a predetermined or longer period passed after the latest reception while receiving no periodic data to be received from the time synchronization reference device 11 in the domain D1. Disconnection of the time synchronization reference device

11 from the network stops transmission of periodic data. Thus, step S21 corresponds to a process for determining whether the time synchronization reference device 11 is connected to or disconnected from the network.

When determining that periodic data is not interrupted (No in step S21), the determination in step S21 is repeated. When determining that periodic data is interrupted (Yes in step S21), the time synchronization subdevice 20 determines that the time synchronization reference device 11 is disconnected from the network, switches the setting of the time synchronization subdevice 20 from a time synchronization subnode to a time synchronization reference node candidate, and transmits, to another time synchronization subdevice 20, first priority information without changing the first reference priority (step S22). For example, the time synchronization subdevice 21 does not change the first reference priority stored in the storage 31. The first priority transmitter 341 transmits an arbitration frame including first priority information indicating the first priority of 1 of the time synchronization reference device 11 to the time synchronization subdevice 22 in the same manner as before the periodic data is interrupted.

The distributor 343 distributes new shared time to another time synchronization subdevice 20 (step S23). For example, the distributor 343 in the time synchronization subdevice 21 distributes time measured by the clocking unit 322 in the time synchronization subdevice 21 as new shared time to the time synchronization subdevice 22 and to the time synchronization subdevice 23 through the time synchronization subdevice 22.

The processing in steps S22 and S23 causes the time synchronization subdevice 22 to synchronize time with the time synchronization subdevice 21 being a time synchronization reference node candidate without performing the BMCA. The time synchronization subdevice 22 also transmits first priority information indicating the first reference priority of 1 to the time synchronization subdevice 23. The entire network excluding the time synchronization reference device 11 can maintain time synchronization with the time synchronization subdevice 21 being a time synchronization reference node candidate.

The second priority information transmitter 342 then transmits second priority information indicating the device-specific second priority to another time synchronization subdevice 20 (step S24). For example, the second priority information transmitter 342 in the time synchronization subdevice 21 transmits second priority information indicating the second priority of 2 assigned to the time synchronization subdevice 21 to the time synchronization subdevice 22, and to the time synchronization subdevice 23 through the time synchronization subdevice 22. The second priority information may be broadcasted or multicasted to communication devices 10 in the network. To determine a new time synchronization reference node from candidates for a time synchronization reference node in a short period of time, the second priority information may be transmitted independently of the period of the arbitration frame. When an arbitration frame including second priority information is transmitted, new information or a process may be defined to prevent other time synchronization subdevices 20 from performing the BMCA by referring to the second priority indicated with the second priority information.

The second priority information receiver 332 determines whether second priority information is received from another time synchronization subdevice 20 (step S25). In the network structure illustrated in FIG. 1, the time synchronization subdevices 21 and 23 detecting the interruption of periodic data are candidates for a time synchronization reference node, and transmit second priority information. The second priority information receiver 332 in the time synchronization subdevice 21 thus receives second priority information from the time synchronization subdevice 23 in step S25.

When determining that second priority information is received (Yes in step S25), the time synchronization subdevice 20 determines whether the device-specific second priority is lower than the received second priority (step S26). More specifically, the controller 32 in the time synchronization subdevice 20 determines whether second priority information is received from another time synchronization subdevice 20 within a predetermined period after the second priority information is transmitted in step S24. For example, the controller 32 in the time synchronization subdevice 21 determines that the second priority of 2 assigned to the time synchronization subdevice 21 is prioritized over the second priority of 4 of the time synchronization subdevice 23 indicated with the second priority information received from the time synchronization subdevice 23. Thus, the result of determination in step S26 is negative.

When determining that the device-specific second priority is lower than the received second priority (Yes in step S26), the time synchronization subdevice 20 switches the setting of the time synchronization subdevice 20 from a time synchronization reference node candidate to a time synchronization subnode. After preannouncing that transmission of first priority information and distribution of shared time are to be stopped, the time synchronization subdevice 20 stops transmitting the first priority information and distributing the shared time (step S27). This can eliminate unintended synchronous processing of time. In a network structure including multiple candidates for a time synchronization reference node that are star-connected through a switch, a time synchronization subdevice 20 that switches to a time synchronization subnode in step S27 may change the time synchronization transmitter port connected to the switch to a time synchronization receiver port. The time synchronization subdevice 20 may thus share time with a new time synchronization reference node. This ends the process for selecting a time synchronization reference node.

When determining that second priority information is not received in step S25 (No in step S25), or when determining that the device-specific second priority is not lower than the received second priority in step S26 (No in step S26), the time synchronization subdevice 20 switches the setting of the time synchronization subdevice 20 to a time synchronization reference node and continues to transmit the first priority information and to distribute the shared time (step S28). The time synchronization subdevice 20 thus functions as a new time synchronization reference node. This ends the process for selecting a time synchronization reference node.

Figure 9:
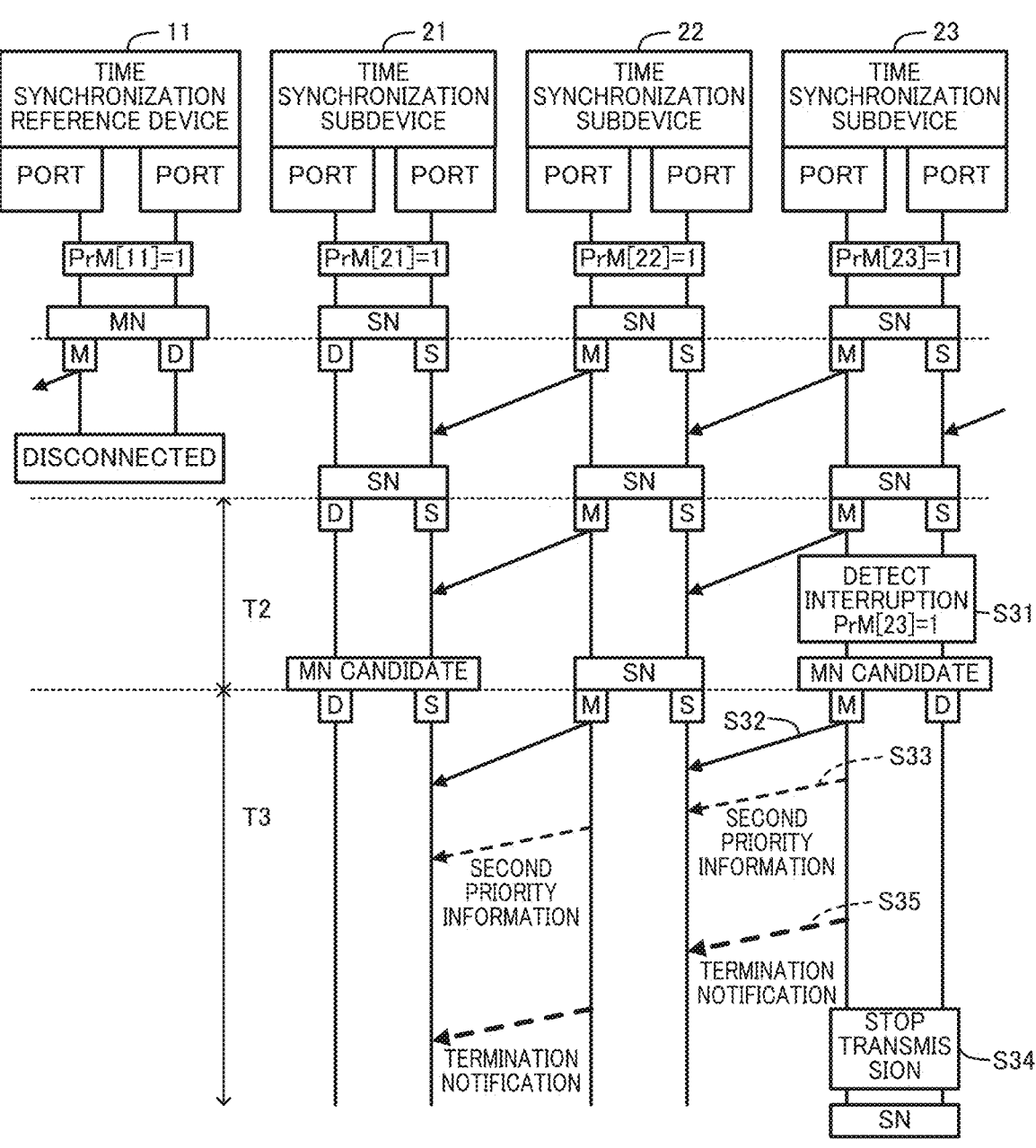
FIG. 9 is a diagram illustrating an overview of communications in a first domain in the embodiment.

FIG. 9 illustrates an overview of communications in the domain D2 with the time synchronization subdevices 21 to 23 each performing the process for selecting a time synchronization reference node after disconnection of the time synchronization reference node from the network.

In step S31 in FIG. 9, the time synchronization subdevice 23 detects the interruption of periodic data and switches to a time synchronization reference node candidate. In FIG. 9, an MN candidate is a time synchronization reference node candidate. The time synchronization subdevice 23 does not change the first reference priority of 1, generates an arbitration frame including first priority information indicating the first reference priority of 1, and transmits the arbitration frame to the time synchronization subdevice 22 in step S32.

The time synchronization subdevice 22 thus does not perform the BMCA. In the domain D2, the time synchronization subdevices 21 to 23 continue to synchronize time with the time synchronization subdevice 23 being a time synchronization reference node candidate.

Figure 10:
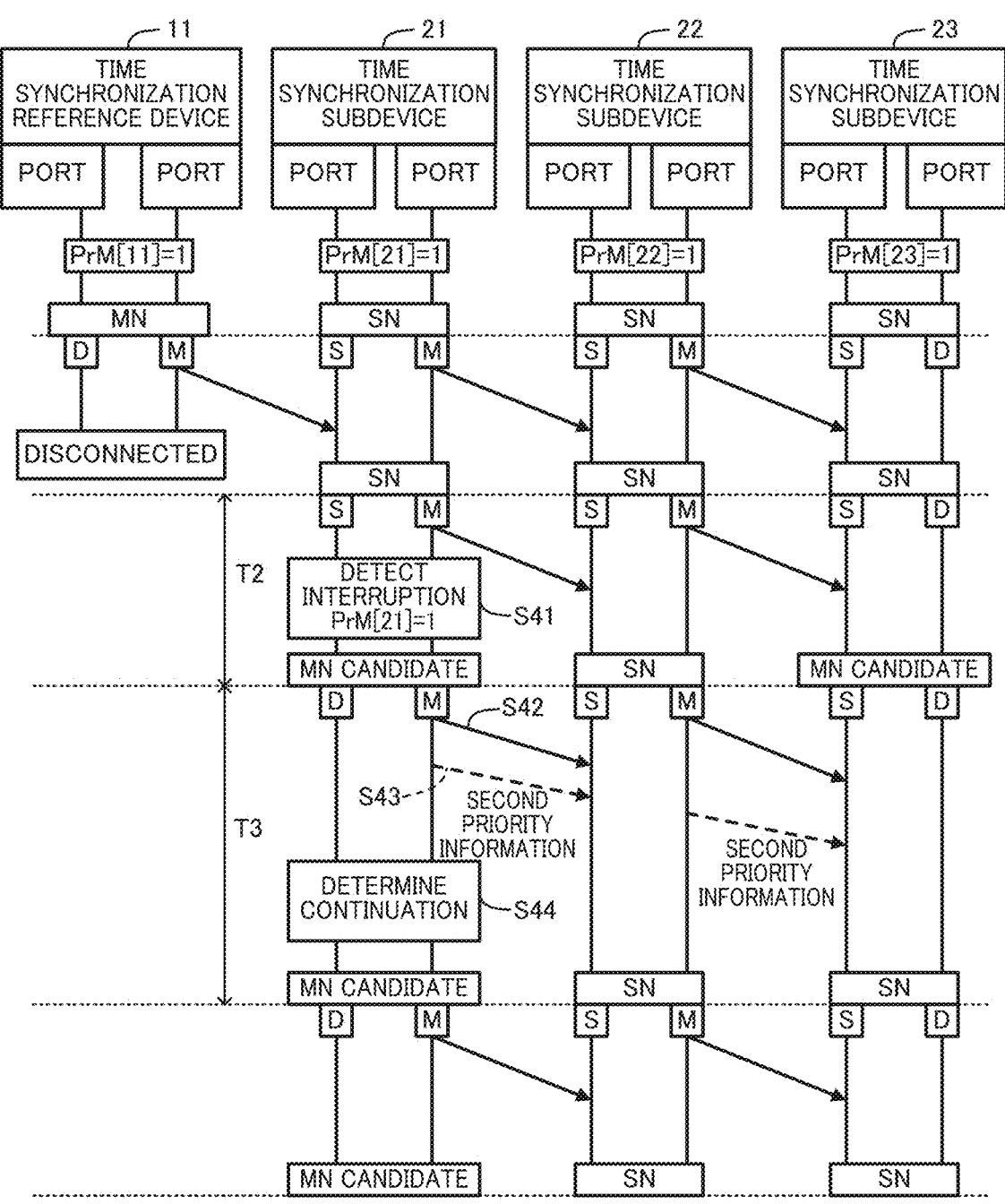
FIG. 10 is a diagram illustrating an overview of communications in a second domain in the embodiment.

FIG. 10 illustrates an overview of communications in the domain D1 in the same situation as in FIG. 9. In step S41 in FIG. 10, the time synchronization subdevice 21 detecting the interruption of periodic data switches to a time synchronization reference node candidate. The time synchronization subdevice 21 does not change the first reference priority of 1, generates an arbitration frame including first priority information indicating the first reference priority of 1, and transmits the arbitration frame to the time synchronization subdevice 22 in step S42. The time synchronization subdevice 22 thus does not perform the BMCA in the domain D1 as well. In the domain D1, the time synchronization subdevices 21 to 23 continue to synchronize time with the time synchronization subdevice 21 being a time synchronization reference node candidate.

In step S33 in FIG. 9, the time synchronization subdevice 23 transmits second priority information indicating the device-specific second priority of 4 to the time synchronization subdevices 21 and 22. In step S43 in FIG. 10, the time synchronization subdevice 21 transmits second priority information indicating the device-specific second priority of 2 to the time synchronization subdevices 22 and 23.

In step S34 in FIG. 9, after comparing the second priorities, the time synchronization subdevice 23 switches to a time synchronization subnode, and stops transmitting an arbitration frame including the first priority information and distributing shared time. The time synchronization subdevice 23 preannounces the termination in step S34 by transmitting a termination notification in step S35. In step S44 in FIG. 10, after comparing the second priorities, the time synchronization subdevice 21 switches from a time synchronization reference node candidate to a time synchronization reference node, and determines to continue to synchronize time. In other words, the time synchronization subdevice 21 continues to transmit an arbitration frame including the first priority information and to distribute shared time, and thereafter functions as a time synchronization reference node.

As indicated with FIGS. 9 and 10, a new time synchronization reference node is selected in the period T3 subsequent to the period T2 in which the time synchronization subdevices 21 and 23 detect the disappearance of the time synchronization reference node. The new time synchronization reference node is selected faster than with the BMCA illustrated in FIGS. 5 to 7.

In the present embodiment as described above, when periodic data is interrupted, the first priority transmitter 341 in the time synchronization subdevice 20 transmits, to another time synchronization subdevice 20, first priority information to be transmitted with the periodic data being continuously received. The distributor 343 distributes new shared time to another time synchronization subdevice when the device-specific second priority is higher than the second priority indicated with the received second priority information. The first priority transmitter 341 stops transmitting the first priority information when the device-specific second priority is lower than the second priority indicated with the received second priority information.

Thus, no time synchronization subdevice 20 is to perform the BMCA. A time synchronization subdevice 20 with a higher second priority among time synchronization subdevices 20 detecting the interruption of periodic data from the time synchronization reference node is to be a time synchronization reference node for distributing shared time. More specifically, in the above embodiment, the time synchronization subdevice 23 does not cause the other time synchronization subdevice 22 to perform the BMCA. The subdevice with a higher second priority between the time synchronization subdevice 23 and the time synchronization subdevice 21 different from the time synchronization subdevice 23 is to be a new time synchronization reference node.

This allows the time sharing system 1000 to avoid performing the BMCA for selecting a new time synchronization reference node and to distribute new shared time from a single device in a short period of time. Thus, a network structure including multiple paths from time synchronization subdevices 20 to a time synchronization reference node can avoid abnormal time synchronization upon disconnection of the time synchronization reference node.

When switching to a time synchronization subnode based on a comparison between second priorities, a time synchronization subdevice 20 being a time synchronization reference node candidate preannounces, to another time synchronization subdevice 20, that the time synchronization subdevice 20 is to stop transmitting first priority information and distributing shared time. This allows the other time synchronization subdevice 20 to discontinue a process for sharing time with a superordinate device, and to avoid generating an unintended processing load.

Although the above embodiment uses second priorities defined in the same format as the first priorities, the second priorities may be defined differently. For the second priorities defined in a format different from a format of the first priorities, the user can set any intended priorities.

The time synchronization subdevices 21 and 23 detecting the interruption of periodic data from the time synchronization reference node are to be candidates for a new time synchronization reference node. The other time synchronization subdevice 22 is excluded from the candidates for a new time synchronization reference node. In other words, the periodic data receivers 331 in the time synchronization subdevices 21 and 23 each receive periodic data transmitted from the time synchronization reference device 11 and along one path illustrated in FIG. 1 as well as periodic data along another path through another time synchronization subdevice 20. When the periodic data received along one path described above is interrupted, the first priority transmitters 341 in the time synchronization subdevices 21 and 23 each continue to transmit first priority information, and the second priority information receivers 332 each transmit second priority information to the other time synchronization subdevice 22. Among the time synchronization subdevices 20, candidates for a new time synchronization reference node are limited to the time synchronization subdevices 20 adjacent to the time synchronization reference node. This allows selecting a new time synchronization reference node in a short period of time.

Although an embodiment of the present disclosure have been described above, the present disclosure is not limited to the above embodiment.

In the above embodiment, for example, avoiding performing the BMCA shortens the time for selecting a time synchronization reference node. However, the BMCA may be performed as appropriate. For example, in the phase of preparing a network, the BMCA may select a time synchronization reference node having the best clock accuracy. In the phase of operating the network, the process for selecting a time synchronization reference node illustrated in FIG. 8 may be performed.

FIG. 11 illustrates a BMCA process performed by each time synchronization subdevice 20 for performing the BMCA in the network. In the BMCA process, a time synchronization subdevice 20 determines whether periodic data is received (step S51). Similarly to step S21 in FIG. 8, this determination corresponds to a process of detecting disconnection of the time synchronization reference node.

When determining that the periodic data is not received (No in step S51), the time synchronization subdevice 20 switches the setting to a time synchronization reference node, and updates the first reference priority with the first priority assigned to the time synchronization subdevice 20 (step S52). The first priority information transmitted from the time synchronization subdevice 20 thus indicates the first priority assigned to the time synchronization subdevice 20 as the first priority of the time synchronization reference node. The time synchronization subdevice 20 advances the processing to step S58.

When determining that the periodic data is received (Yes in step S51), the time synchronization subdevice 20 acquires first priority information indicating the first reference priority from another time synchronization subdevice 20 (step S54). More specifically, the time synchronization subdevice 20 receives an arbitration frame from the other time synchronization subdevice 20, and acquires the first reference priority indicated with the first priority information included in the arbitration frame.

The time synchronization subdevice 20 then determines whether the device-specific first reference priority is different from the first reference priority indicated with the first priority information acquired in step S54 (step S55). When the result of determination in step S55 is negative (No in step S55), the time synchronization subdevice 20 advances the processing to step S58 without performing step S52 or S57.

When the result of determination in step S55 is affirmative (Yes in step S55), the time synchronization subdevice 20 determines whether the value of the device-specific first reference priority is greater than the value of the first reference priority indicated with the first priority information acquired in step S54 (step S56). In other words, the time synchronization subdevice 20 determines whether to be a new time synchronization subnode.

When the result of determination in step S56 is negative (No in step S56), the time synchronization subdevice 20 advances the processing to step S52. When the result of determination in step S56 is affirmative (Yes in step S56), the time synchronization subdevice 20 switches the setting to a time synchronization subnode, and updates the first reference priority stored in the time synchronization subdevice 20 with the first reference priority indicated with the first priority information acquired in step S54 (step S57). The time synchronization subdevice 20 thus transmits first priority information indicating the first priority of the other time synchronization subdevice 20 indicated with the acquired first priority information.

Subsequently, the time synchronization subdevice 20 determines whether the arbitration is complete (step S58). More specifically, the time synchronization subdevice 20 determines whether the first reference priority is maintained without a change for a period of time acquired from the transmission period of the arbitration frame multiplied by a predetermined coefficient. When the arbitration is determined incomplete (No in step S58), the time synchronization subdevice 20 returns the processing to step S51. When the arbitration is determined complete (Yes in step S58), the BMCA process ends.

The communication devices 10 are connected in a ring network in the above embodiment, or may be connected differently. For example, the time sharing system 1000 may include a star network structure or a mesh network structure.

A multi-domain ring network has redundancy that allows communications to continue when one transmission path is disconnected. Disconnection of a network cable or disconnection of a time synchronization subdevice 20 from the network due to malfunctions may cause unintended selection of a new time synchronization reference node through the procedure described in the above embodiment, although the time synchronization reference node is not disconnected from the network. Thus, when the existing time synchronization reference node receives second priority information from a time synchronization subdevice 20 being a time synchronization reference node candidate, the second priority of the time synchronization reference node may be provided to the time synchronization subdevice 20. When the time synchronization reference node candidate acquires the second priority of the time synchronization reference node, the time synchronization reference node candidate may discontinue the process for selecting a time synchronization reference node. Adding such a discontinuation process can prevent a new time synchronization reference node from being selected during a normal operation of the time synchronization reference node. In some embodiments, a frame may be newly defined to inquire connection or disconnection of a time synchronization reference node. The newly defined frame may be used to determine connection or disconnection of the time synchronization reference node before a time synchronization subdevice 20 detecting the interruption of a time frame switches to a time synchronization reference node candidate. Connection or disconnection of the time synchronization reference node may be determined with any other methods.

The clocking unit 322 may not be incorporated in the time synchronization subdevice 20. The time synchronization subdevice 20 as a new time synchronization reference node may distribute, to another time synchronization subdevice 20, time acquired from an external clocking device as shared time.

In the illustrated example, the time synchronization subdevices 21 and 23 adjacent to the time synchronization reference device 11 are to be candidates for a new time synchronization reference node upon disconnection of the time synchronization reference device 11. When the time synchronization reference device 11 and the time synchronization subdevice 21 are disconnected, the time synchronization subdevice 22 performs, as a time synchronization reference node candidate, the same processes as the time synchronization subdevice 21 described above. Thus, disconnection of any node in the network does not cause the BMCA to be performed, and a new time synchronization reference node can be selected in a short period of time. A new time synchronization reference node can also be selected in a short period of time without performing the BMCA when any of the transmission paths included in the network is disconnected.

Although the subdevices in the illustrated example have different second priorities, the subdevices may have other second priorities. Multiple time synchronization subdevices 20 may have the second priorities equal to one another. When the multiple time synchronization subdevices 20 have the same second priority, a procedure is to be set in advance to prevent each of the multiple time synchronization subdevices 20 from being a new time synchronization reference node. For example, among the multiple time synchronization subdevices 20 having the same second priority, a single time synchronization subdevice 20 having the highest first priority may be selected as a time synchronization reference node. The other time synchronization subdevices 20 may be time synchronization subnodes. In some embodiments, the single time synchronization subdevice 20 to be a new time synchronization reference node may be randomly selected from the multiple time synchronization subdevices 20 having the same second priority.

The functions of the time synchronization subdevice 20 can be implementable by dedicated hardware or a common computer system.

For example, the program P1 executable by the processor 110 may be stored in a non-transitory computer-readable recording medium for distribution. The program P1 is installed in a computer to provide a device that performs the above processing. Examples of such non-transitory recording media include a flexible disk, a compact disc read-only memory (CD-ROM), a digital versatile disc (DVD), and a magneto-optical (MO) disk.

The program P1 may be stored in a disk device included in a server on a communication network, typically the Internet, and may be, for example, superimposed on a carrier wave to be downloaded to a computer.

The processing described above may also be performed by the program P1 being activated and executed while being transferred through a communication network.

The processing described above may also be performed by the program P1 being entirely or partially executed on a server with a computer transmitting and receiving information about the processing through a communication network.

In the system with the above functions implementable partly by the operating system (OS) or through cooperation between the OS and applications, portions executable by applications other than the OS may be stored in a non-transitory recording medium that may be distributed or may be downloaded to a computer.

Means for implementing the functions of the time synchronization subdevice 20 is not limited to software. The functions may be partly or entirely implemented by dedicated hardware including circuits.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure is applicable to a system including multiple devices that synchronize time on a network.

REFERENCE SIGNS LIST

1000 Time sharing system
10 Communication device
11 Time synchronization reference device
110 Processor
120 Main storage
130 Auxiliary storage
140 Clock

19

150 Input device
160 Output device
170 Communicator
171, 172 Port
180 Internal bus
20 to 23 Time synchronization subdevice
31 Storage
310 Device-specific first priority
311 First priority of time synchronization reference node
312 Device-specific second priority
32 Controller
321 Acquirer
322 Clocking unit
33 Reception processor
331 Periodic data receiver
332 Second priority information receiver
34 Transmission processor
341 First priority transmitter
342 Second priority information transmitter
343 Distributor
35 Communicator
351 Time synchronization transmitter port
352 Time synchronization receiver port
353 Disabled port
D1, D2 Domain
T1 to T3 Period
P1 Program

The invention claimed is:

1. A time synchronization subdevice for sharing shared time with a time synchronization reference device and relaying distribution of the shared time to another time synchronization subdevice, the time synchronization reference device being a time synchronization reference node to distribute the shared time, the time synchronization subdevice comprising:

a periodic data receiver to receive periodic data transmitted periodically from the time synchronization reference device;

acquiring circuitry to acquire first priority information indicating a first priority assigned to the time synchronization reference device, the first priority indicating a degree of priority in selecting the time synchronization reference node;

a first priority transmitter to transmit, when the periodic data received by the periodic data receiver is interrupted, the first priority information to be transmitted with the periodic data being continuously received to the another time synchronization subdevice;

a second priority information transmitter to transmit, when the periodic data is interrupted, transmission information indicating a second priority assigned to the time synchronization subdevice to the another time synchronization subdevice;

a second priority information receiver to receive, from the another time synchronization subdevice, reception information indicating a second priority assigned to a device different from the time synchronization subdevice; and a distributor to distribute, when the periodic data is interrupted and the second priority assigned to the time synchronization subdevice is higher than the second priority indicated with the reception information, time measured by clocking circuitry different from the time synchronization reference device as new shared time to the another time synchronization subdevice, wherein the first priority transmitter stops transmission of the first priority information when the second priority assigned to the time synchronization subdevice is lower than the second priority indicated with the reception information.

2. The time synchronization subdevice according to claim 1, wherein
the first priority transmitter preannounces, to the another time synchronization subdevice, that transmission of the first priority information from the time synchronization subdevice is to be stopped when the second priority assigned to the time synchronization subdevice is lower than the second priority indicated with the reception information.

3. The time synchronization subdevice according to claim 1, wherein
the second priority is defined in a format different from a format of the first priority.

4. The time synchronization subdevice according to claim 1, wherein
the periodic data receiver receives the periodic data transmitted from the time synchronization reference device along a first path and receives the periodic data transmitted along a second path different from the first path through the another time synchronization subdevice,
the second priority information transmitter transmits the first priority information to the another time synchronization subdevice when the periodic data received along the first path by the periodic data receiver is interrupted, and
the second priority information receiver transmits the transmission information to the another time synchronization subdevice when the periodic data received along the first path is interrupted.

5. A time sharing system, comprising:
a time synchronization reference device being a time synchronization reference node to distribute shared time;
a plurality of the time synchronization subdevices according to claim 1 to be connected to the time synchronization reference device; and
another time synchronization subdevice to be connected to at least one time synchronization subdevice of the plurality of time synchronization subdevices.

6. A time sharing method to be implemented by a time synchronization subdevice for sharing shared time with a time synchronization reference device and relaying distribution of the shared time to another time synchronization subdevice, the time synchronization reference device being a time synchronization reference node to distribute the shared time, the time sharing method comprising:
receiving periodic data transmitted periodically from the time synchronization reference device;
transmitting, when the received periodic data is interrupted, first priority information to be transmitted with the periodic data being continuously received to the another time synchronization subdevice, the first priority information indicating a first priority assigned to the time synchronization reference device, the first priority indicating a degree of priority in selecting the time synchronization reference node;
distributing, when the periodic data is interrupted and a second priority assigned to the time synchronization subdevice is higher than a second priority assigned to a device different from the time synchronization subdevice, time measured by clocking circuitry different from the time synchronization reference device as new shared time to the another time synchronization subdevice; and stopping transmission of the first priority information when the second priority assigned to the time synchronization subdevice is lower than the second priority assigned to the other device.

7. A non-transitory computer-readable recording medium storing a program to be executed by a time synchronization subdevice for sharing shared time with a time synchronization reference device and relaying distribution of the shared time to another time synchronization subdevice, the time synchronization reference device being a time synchronization reference node to distribute the shared time, the program causing the time synchronization subdevice to perform operations comprising:

receiving periodic data transmitted periodically from the time synchronization reference device;

transmitting, when the received periodic data is interrupted, first priority information to be transmitted with the periodic data being continuously received to the another time synchronization subdevice, the first priority information indicating a first priority assigned to the time synchronization reference device, the first priority indicating a degree of priority in selecting the time synchronization reference node;

distributing, when the periodic data is interrupted and a second priority assigned to the time synchronization subdevice is higher than a second priority assigned to a device different from the time synchronization subdevice, time measured by clocking circuitry different from the time synchronization reference device as new shared time to the another time synchronization subdevice; and stopping transmission of the first priority information when the second priority assigned to the time synchronization subdevice is lower than the second priority assigned to the other device.

* * * * *